US009739634B2

(12) United States Patent
Trivedi

(10) Patent No.: US 9,739,634 B2
(45) Date of Patent: Aug. 22, 2017

(54) MULTICOMPUTER DATA TRANSFERRING FOR TRANSFERRING DATA BETWEEN MULTIPLE COMPUTERS THAT USE THE DATA AFTER THE TRANSFER

(71) Applicant: Verizon Patent and Licensing Inc., Arlington, VA (US)

(72) Inventor: Prakash A. Trivedi, Centreville, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/943,934

(22) Filed: Nov. 17, 2015

(65) Prior Publication Data

US 2017/0045364 A1 Feb. 16, 2017

Related U.S. Application Data

(63) Continuation-in-part of application No. 12/242,135, filed on Sep. 30, 2008, now abandoned.

(51) Int. Cl.
*G01C 21/36* (2006.01)
*G01C 21/34* (2006.01)
*H04L 29/08* (2006.01)
*H04L 12/761* (2013.01)
*H04W 4/02* (2009.01)

(52) U.S. Cl.
CPC ......... *G01C 21/3679* (2013.01); *G01C 21/34* (2013.01); *G01C 21/3476* (2013.01); *G01C 21/3682* (2013.01); *H04L 45/16* (2013.01); *H04L 67/18* (2013.01); *H04L 67/306* (2013.01); *H04W 4/02* (2013.01)

(58) Field of Classification Search
CPC ............ G01C 21/3679; G01C 21/3682; G01C 21/3685
See application file for complete search history.

(56) References Cited

U.S. PATENT DOCUMENTS 5,724,243 A 3/1998 Westerlage et al.
6,317,686 B1 * 11/2001 Ran .................... G01C 21/3691
701/117

(Continued)

*Primary Examiner* — Behrang Badii
*Assistant Examiner* — David Testardi

(57) ABSTRACT

A system for providing multicomputer data transfer for transferring data between multiple devices that use the data after the multicomputer data transfer, includes a user profiles repository to store user profiles associated with users of client devices, and a content repository to store communication information. The system includes a platform device communicating with the client devices, the user profiles repository, and the content repository via networks. The platform device is configured to: receive the user profiles from the user profile repository; receive the communication information from the content repository; receive real-time positional information corresponding to a particular client device, of the client devices; determine a particular user profile, of the user profiles, based on the particular client device; determine particular communication information, of the communication information, based the positional information and the particular user profile; and provide the particular communication information to the particular client device, via the networks.

20 Claims, 9 Drawing Sheets

(56) References Cited

U.S. PATENT DOCUMENTS

| | | | | |
|---|---|---|---|---|
| 6,349,257 B1* | 2/2002 | Liu | G01C 21/3484 | 340/5.6 |
| 6,587,782 B1* | 7/2003 | Nocek | G01C 21/3682 | 701/438 |
| 7,071,842 B1* | 7/2006 | Brady, Jr. | G01C 21/20 | 340/988 |
| 7,373,244 B2* | 5/2008 | Kreft | G01C 3/08 | 340/988 |
| 7,474,958 B2 | 1/2009 | Nakajima | | |
| 7,532,899 B2* | 5/2009 | Wilson | H04W 4/02 | 455/433 |
| 7,840,427 B2 | 11/2010 | O'Sullivan | | |
| 8,688,367 B2 | 4/2014 | Mauderer | | |
| 2001/0029459 A1* | 10/2001 | Fujiwara | G06Q 10/02 | 705/6 |
| 2002/0047787 A1* | 4/2002 | Mikkola | G01C 21/3679 | 340/995.1 |
| 2005/0107993 A1* | 5/2005 | Cuthbert | G01C 21/20 | 703/2 |
| 2005/0131634 A1* | 6/2005 | Ignatin | G01C 21/3691 | 701/533 |
| 2005/0255861 A1* | 11/2005 | Wilson | H04W 4/02 | 455/456.2 |
| 2006/0041375 A1 | 2/2006 | Witmer et al. | | |
| 2006/0184313 A1* | 8/2006 | Butler | G01C 21/3679 | 701/426 |
| 2007/0032947 A1* | 2/2007 | Yamada | G01C 21/32 | 701/532 |
| 2007/0078596 A1* | 4/2007 | Grace | G01C 21/3476 | 701/533 |
| 2007/0129880 A1* | 6/2007 | Thacher | G01C 21/26 | 701/533 |
| 2007/0198182 A1 | 8/2007 | Singh | | |
| 2007/0282621 A1* | 12/2007 | Altman | G06Q 10/10 | 705/319 |
| 2008/0027632 A1 | 1/2008 | Mauderer | | |
| 2008/0158018 A1* | 7/2008 | Lau | G01C 21/20 | 340/995.24 |
| 2008/0163073 A1* | 7/2008 | Becker | G06Q 30/00 | 715/753 |
| 2008/0172173 A1 | 7/2008 | Chang et al. | | |
| 2008/0262717 A1* | 10/2008 | Ettinger | G01C 21/3476 | 701/467 |
| 2008/0281511 A1* | 11/2008 | Miyata | G01C 21/3682 | 701/408 |
| 2009/0005973 A1 | 1/2009 | Salo et al. | | |
| 2009/0012953 A1* | 1/2009 | Chu | H04W 4/02 | |
| 2009/0100018 A1* | 4/2009 | Roberts | G06Q 30/0603 | |
| 2009/0143977 A1 | 6/2009 | Beletski et al. | | |
| 2009/0143984 A1* | 6/2009 | Baudisch | G01C 21/36 | 701/300 |
| 2009/0319348 A1* | 12/2009 | Khosravy | G01C 21/20 | 705/14.1 |
| 2010/0036834 A1* | 2/2010 | Bandas | G01C 21/3644 | 707/724 |
| 2010/0082241 A1* | 4/2010 | Trivedi | G01C 21/3679 | 701/532 |

* cited by examiner

MULTICOMPUTER DATA TRANSFERRING FOR TRANSFERRING DATA BETWEEN MULTIPLE COMPUTERS THAT USE THE DATA AFTER THE TRANSFER

BACKGROUND

The advent of wireless communication systems has served as a catalyst for the ubiquity of mobile computing devices, as well as the introduction of increasingly more complex services, such as navigational services. In conjunction with location-awareness technologies, like global positioning system (GPS) receivers, mobile computing devices now enable consumers to obtain real-time routing information, e.g., turn-by-turn directions, while in route to a predetermined destination. In order to facilitate terrestrial navigation, this routing information is typically presented with a topological depiction of a geographic area surrounding the destination, which may also be appended with various cartographic features, such as buildings, landmarks, roadways, signs, and the like. However, little effort has been devoted to providing more interactivity with the user, or richer navigational services.

Therefore, there is a need for an approach that provides for more dynamic, customizable navigational services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing managed navigational services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to global positioning system (GPS) technology, it is contemplated that various exemplary embodiments are also applicable to other equivalent navigational and location determination technologies. Further, this application hereby incorporates by reference the entire contents of U.S. patent application Ser. No. 12/242,135, filed on Sep. 30, 2008.

Figure 1:
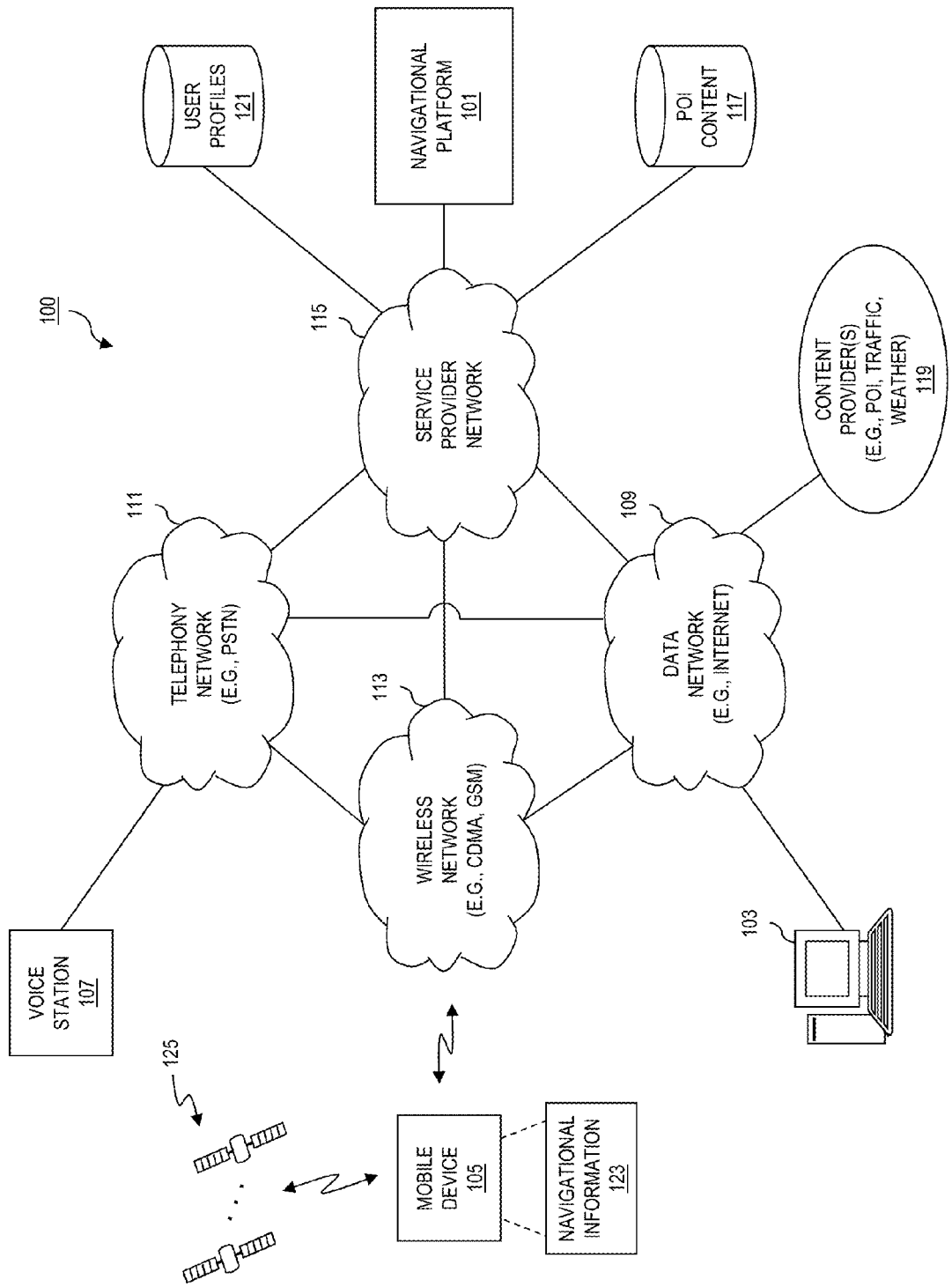
FIG. 1 is a diagram of a system capable of providing navigational services, according to an exemplary embodiment.

FIG. 1 is a diagram of a system capable of providing navigational services, according to an exemplary embodiment. For the purposes of illustration, system 100 including navigational platform 101 configured to provide managed navigational services to one or more client devices (e.g., computing device 103, mobile device 105, and voice station 107) over one or more networks (e.g., data network 109, telephony network 111, and/or wireless network 113) is described with respect to service provider network 115. While specific reference will be made thereto, it is contemplated that system 100 may embody many forms and include multiple and/or alternative components and facilities.

Conventional navigational services provide subscribers with real-time routing information, which may be supplemented with enhanced content like point of interest (POI) information and estimated time of arrival (ETA) information. That is, service enhancements like searchable POIs and estimated times of arrival enable consumers to obtain predefined waypoints, such as select banks, hotels, museums, restaurants, stores, tourist attractions, etc., as well as acquire a sense for the amount of time required to reach such destinations. Traditionally, these services have been limited to providing subscribers with "batched" results conveying standard, non-individualized information. Typically, POI waypoints are copied in a memory of a mobile computing device so that as an individual traverses a mapped route, stored POIs may be searched for, selected from, and/or presented to users of the mobile computing device. While this POI information can enrich navigational experiences, it is provider-defined information that is made available to users via conventional variables, such as POI category and POI proximity. Further, ETAs tend to be inaccurate because only certain road characteristics, like distance, speed limit, and traffic lights, are considered, while other influential factors are overlooked. Therefore, the approach according to certain embodiments stems from the recognition that providing managed navigational services, whereby individuals can seamlessly define, customize, and obtain dynamic POI information and acquire more accurate ETA information, provides an efficient and convenient technique to enable individuals to enhance and personalize their navigational experiences, as well as provides service providers a synergistic approach for leveraging existing infrastructures and for generating new sources of revenue.

According to certain embodiments, system 100 introduces managed navigational services whereby users (or subscribers) can access navigational platform 101 via one or more client devices (e.g., computing device 103, mobile device 105, or voice station 107) to create, customize, and manage POI content, such as one or more POI categories, POI instances, or POI metadata, as well as register and receive authentication information for the services. It is noted that POI categories relate to suitable taxonomical classifications (or groupings) of similarly situated POI instances that, in turn, relate to specific waypoint definitions (e.g., waypoint "X" at location "Y"). POI metadata can relate to any suitable information about a particular POI instance, such as contact information, description, hours of operation, product or service offerings (e.g., menus, catalogues, etc.), product or service prices, or any other suitable information. It is contemplated that POI metadata may also relate to and/or be used describe or provide information about POI categories.

According to various embodiments, users may access navigational platform 101 via a portal, such as a voice portal or a web portal. In exemplary embodiments, an application for providing the portal is deployed via navigational platform 101; however, it is contemplated that another facility or component of system 100, such as a frontend, middleware, or backend server, can deploy the application and, consequently, interface with navigational platform 101. The portal includes or provides access to one or more catalogs of POI content, such as one or more catalogs stored to POI content repository 117 or made available by one or more third-party content providers 119. In this manner, the portal enables users to input corresponding authentication information and, subsequently, create, customize, and manage one or more user-defined (i.e., individualized) catalogues of POI content. The portal also enables a user to construct a user profile that, in exemplary embodiments, includes one or more user-defined POI policies for dynamically identifying approaching POIs to the user based on real-time positional information corresponding to the location of the user. User profiles can be stored to a user profiles repository 121 or other suitable location, such as one or more memories of client devices 103-107 or navigational platform 101. Dynamic identification of approaching POIs may also be based on correlation with travel information (e.g., planned routes, schedules, etc.) and POI metadata. In certain instances, one or more conditional variables, e.g., traffic conditions, weather conditions, historic travel times, etc., may be utilized to dynamically identify approaching POIs to users. It is also contemplated that the various variables utilized to dynamically identify one or more approaching POIs may also be utilized to rank the suitability of approaching POIs. Consequently, users may be dynamically provided with approaching POI content corresponding to conventional POIs that are defined and maintained by a service provider or third-party and/or individualized POIs that are created, customized, and managed by the user.

According to other embodiments, the managed navigational services of system 100 enables subscribers to search for and acquire POI content from one or more POI content repositories (e.g., POI content repository 117, one or more POI content repositories maintained by content providers 119, etc.) or a local memory of a client device (e.g., client devices 103-107). That is, users may access navigational platform 101 via the portal (e.g., voice portal or web portal), search and acquire POI content at, for example, one or more of client devices 103-107. It is also contemplated that users may directly interface with the POI content repositories, such as POI content repository 117.

Users may also utilize a graphical user interface (GUI) of client devices 103-107 to search for and acquire POI content. It is noted that a GUI interface of client devices 103-107 may be controlled and provided by client devices 103-107 and/or controlled and provided by navigational platform 101. As such, the search functions of the managed navigational services of system 100 may be broadly performed based on one or more POI categories or tailored towards specific POI instances. In addition, search queries and the result acquired therefrom may be narrowed and/or ranked based on POI metadata, traffic information, travel information, weather information, historical travel times, etc.

The managed navigational services of system 100, in an exemplary embodiment, dynamically provide users with navigational information 123 based on real-time positioning information corresponding to the location of a user, i.e., the location of a mobile device of the user, e.g., mobile device 105. The spatial position (or location) of a mobile device 105 may be determined through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. As is well known, SPS technology utilizes a constellation 125 of satellites that transmit signals to receivers (not shown) of, for example, one or more mobile devices 105, so that the receivers may determine corresponding spatial positions (or locations), speeds, directions, and/or timing for the mobile devices 105. Mobile devices 105 report this information to navigational platform 101 to facilitate the rendering of dynamically provided navigational information 123, as well as other managed navigational services extended via navigational platform 101. It is also noted that navigational platform 101 may "poll" or receive positioning information from mobile devices 105 in real-time, so as to provide presence service features to mobile devices 105.

Navigational information 123 can include one or more approaching POIs that are dynamically provided to users via navigational platform 101 while the users are in route to one or more planned destinations, i.e., while users are traversing a planned route or trip. It is also contemplated that approaching POIs may be dynamically provided to users based on one or more user-defined POI policies and, therefore, approaching POIs may be dynamically provided to users at any point in time, whether or not the users are traversing a planned route. Navigational information 123 may also include one or more distances from the approaching POIs, ETAs at the approaching POIs, and routes to and from the approaching POIs, as well as other starting and/or destination locations. It is also contemplated that navigational information 123 can include conventional navigational information, such as link and node data, mapping content, turn-by-turn directions, etc. As such, the various forms of navigational information 123 can be determined based on various factors (or variables), such as historical travel times, travel conditions (e.g., traffic), and/or weather conditions. Historical travel times may be stored to user profiles repository 121. Travel and/or weather conditions may be acquired from one or more third-party content providers 119 or may be generated and maintained by the service provider of the managed navigational services. As such, the presentation of this navigational information 123 may be altered so as to correlate with the various influential factors, e.g., mapping content may be presented differently depending on current weather conditions, seasonal information, traffic conditions, etc. Thus, navigational information 123 can, in certain instances, include dynamically provided POIs that have been predefined by a user and stored within POI content repository 117 or other suitable location, such as a local memory of one or more of client devices 103-107.

As seen in FIG. 1, service provider network 115 enables client devices 103-107 to access the managed navigational services of system 100 through navigational platform 101 via networks 109-111. Networks 109-115 may be any suitable wireline and/or wireless network. For example, telephony network 111 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network.

Although depicted as separate entities, networks 109-115 may be completely or partially contained within one another, or may embody one or more of the aforementioned infrastructures. For instance, service provider network 115 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

Accordingly, the conjunction of networks 109-115 may be adapted to provide navigational information 123, such as one or more approaching POIs, to users, as well as enable user access to navigational platform 101. As such, client devices 103-107 may include any customer premise equipment (CPE) capable of sending and/or receiving information over one or more of networks 109-115. For instance, voice station 107 may be any suitable plain old telephone service (POTS) device, facsimile machine, etc., while mobile voice station 105 may be any cellular phone, radiophone, satellite phone, smart phone, wireless phone, or any other suitable mobile device, such as a personal digital assistant (PDA), pocket personal computer, tablet, customized hardware, etc. Further, computing device 103 may be any suitable computing device, such as a VoIP phone, skinny client control protocol (SCCP) phone, session initiation protocol (SIP) phone, IP phone, personal computer, softphone, workstation, terminal, server, etc.

Client devices 103-107 and, in particular mobile device 105, can include one or more client programs that operate thereon for providing access to the managed navigational services of system 100; however, it is contemplated that these client programs may be executed via platform 101 and, thereby, accessible to users via mobile device 105. According to one embodiment, these client programs may relate to one or more GUIs configured to control the presentation of navigational information 123, as well as interface with the other managed navigational services of system 100, such as creating, customizing, and managing POI content or generating one or more user-defined POI policies. Additionally, the GUIs may be configured to facilitate the acquisitioning, exchanging, managing, sharing, storing, and updating of POI content. The GUI applications may interface with the aforementioned portal, e.g., the voice portal or web portals.

As previously mentioned, POI content repository 117 stores POI content, such as POI categories, POI instances, and POI metadata. Repository 117 may be maintained by the service provider of the managed navigational services, or other suitable third-party. In this manner, POI content stored to repository 117 may include user-created, customized, and/or managed content, such as POI content. Meanwhile, user profiles repository 121 may include information corresponding to the users (or subscribers) of the managed navigational services of system 100, such as user profile information, as well as any other suitable information, such as historic travel times relating to the amount of time it has historically taken the user to travel from one location to another. By way of example, user profile information includes subscription information (e.g., account numbers, usernames, passwords, security questions, monikers, etc.), subscriber demographics (e.g., age, gender, ethnicity, location of residence, zip code, school district, community, socioeconomic status, religion, marital status, ownerships, languages, mobility, life cycles, etc.), group/organizational affiliations (e.g., political), memberships, interests, system configurations, policies, associated users/devices, etc.

Accordingly, it is contemplated that the physical implementation of repositories 117 and 121 may take on many forms, including, for example, portions of existing repositories of a service provider, new repositories of a service provider, third-party repositories, and/or shared-repositories. As such, repositories 117 and 121 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 117 and 121 are provided in distributed fashions, information and content available via repositories 117 and 121 may be located utilizing any suitable querying technique, such as electronic number matching, distributed universal number discovery (DUNDi), uniform resource identifiers (URI), etc.

Figure 2:
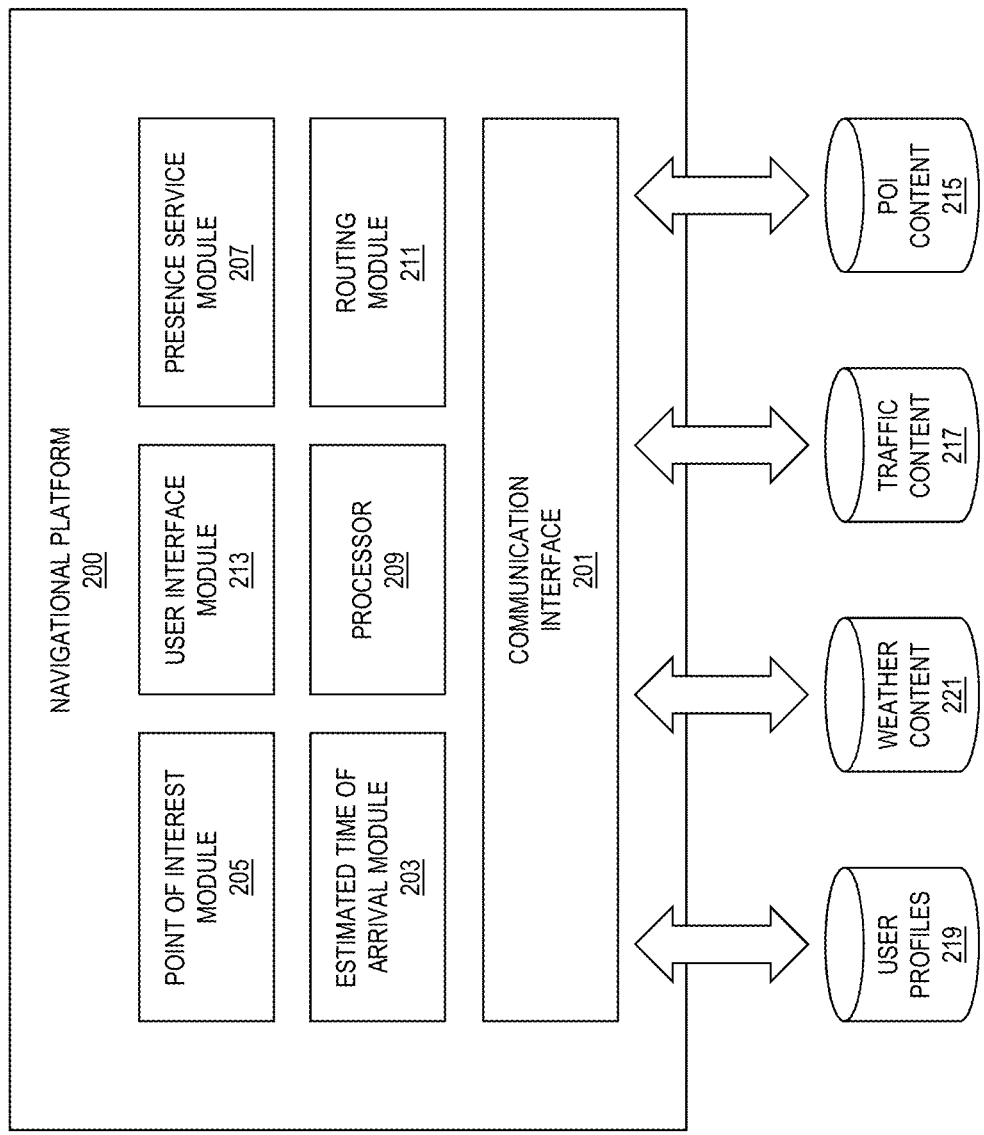
FIG. 2 is a diagram of a navigational platform configured to provide navigational services, according to an exemplary embodiment.

FIG. 2 is a diagram of a navigational platform configured to provide managed navigational services, according to an exemplary embodiment. Navigational platform 200 may comprise computing hardware (such as described with respect to FIG. 9), as well as include one or more components configured to execute the processes described herein for providing the managed navigational services of system 100. In one implementation, platform 200 includes communication interface 201, ETA module 203, POI module 205, presence service module 207, processor 209, routing module 211, and user interface module 213. Platform 200 may also communicate with one or more repositories, such as POI content repository 215, traffic content repository 217, user profiles repository 219, and weather content repository 221. Further, users may access platform 200 via client devices 103-107. It is also contemplated that platform 200 may embody many forms and include multiple and/or alternative components. For example, it is contemplated that the components of platform 200 may be combined, located in separate structures, or separate locations. Namely, a specific topology is not critical to embodiments of platform 200 or system 100 for that matter.

According to one embodiment, platform 200 embodies one or more application servers accessible to client devices 103-107 over one or more of networks 109-115. Users (or subscribers) access platform 200 to create, customize, and manage POIs content, as well as search for and obtain navigational information, such as navigational information 123. It is contemplated that navigational information 123 may be dynamically provided to users based on real-time positioning information and, in certain instances, correlation with travel information, POI metadata, and/or one or more variable factors (e.g., historic travel times, traffic conditions, weather conditions, etc.). As such, platform 200 provides a user interface, e.g., a voice portal, web portal, or an otherwise networked application, to permit user access to the features and functionality of platform 200 via client devices 103-107. According to certain embodiments, user interface module 213 may be configured for exchanging information between client devices 103-107 and a web browser or other networked-based application or system, such as a voice browser or interactive voice recognition system. In exemplary embodiments, user interface module 213 executes a graphical user interface (GUI) application configured to provide users with one or more menus of options for creating, customizing, and managing user profiles and/or POI content, as well as engage with the other features of the managed navigational services of system 100, such as searching for and obtaining POI content, receiving ETAs, acquiring navigational directions, etc.

In this way, navigational information 123 may be generated via ETA module 203, POI module 205, and/or routing module 211. According to exemplary embodiments, routing module 211 is configured to retrieve mapping content in order to generate one or more topological depictions (or maps) of various geographic areas, as well as plan one or more routes (or trips) from starting locations to ending locations within the geographic areas. Determined routes may also include one or more intermediary locations. The starting, intermediary, and/or ending locations may correspond to one or more POIs or one or more user-input addresses, landmarks, positions, etc., that are of relevance to the user. Navigational directions, e.g., turn-by-turn directions, may also be generated by routing module 211, wherein determined routes, corresponding movements (e.g., merges, turns, etc.), and the like, can be overlaid on generated maps and provided to users at for, example, mobile device 105. Routing module 211 may utilize various link and node data corresponding to the geographic areas at least including the starting locations, end locations, and the one or more intermediary locations of a user. Additionally, routing module 211 may utilize "current" spatial positioning of users to determine distances from various destinations, such as select POIs. Distance values may be contingent upon a route that a user selects for navigational purposes.

According to particular embodiments, routing module 211 may generate this content (or information) "on-the-fly" based on real-time positioning information corresponding to the spatial position (or location) of a user. The real-time positioning information may be obtained from a mobile device of a user, e.g., mobile device 105, and tracked via presence service module 207. Additionally, presence service module 207 may "poll" mobile devices 105 for positioning information, as well as capture presence information or availability of mobile device 105, i.e., of subscribers to the managed navigational services of system 100. An exemplary model for presence determination is detailed in Internet Engineering Task Force (IETF) Request for Comment (RFC) 2778, which is incorporated herein by reference in its entirety. According to certain embodiments, the presence or availability of mobile stations (e.g., mobile station 105) may be utilized to initiate the managed navigational services of system 100, e.g., initiate the dynamic identification and transmission of approaching POIs to one or more users via one or more of networks 109-115.

In exemplary embodiments, the presence information and the real-time positioning information corresponding to the respective locations of the users may be utilized by POI module 205 to dynamically identify approaching POIs, which may be transmitted to client devices 103-107 via communication interface 201. POIs may be dynamically identified based on POI content stored to POI content repository 215 and one or more user-defined POI policies stored to user profiles repository 219. Further, POI module 205 may correlate POIs to travel information and POI metadata for narrowing or ranking identified POIs. In a similar vein, POI module 205 may correlate identified POIs to historical travel times, weather conditions, and/or traffic conditions to narrow and/or rank POIs. The historical travel times, weather conditions, and/or traffic conditions can be respectively stored to user profiles repository 219, weather content repository 221, traffic content repository 217. As such, routing information provided via routing module 211 may selectively account one or more of the dynamically identified approaching POIs determined via POI module 205.

According to other embodiments, ETA module 203 may also utilize the presence information and the real-time positioning information, as well as identified approaching POIs to determine one or more ETAs at the approaching POIs. ETA module 203 is also configured to dynamically update ETA information for arriving at pre-established destinations when approaching POIs may possibly, or are to be, visited. In this way, users can gain an appreciation for the extra amount of travel time that visiting an approaching POI will cause. According to certain embodiments, ETA module 203 takes into account various conditional factors when determining an ETA. For instance, ETA module 203 may utilize weather conditions, traffic conditions, and historical travel times respectively stored to weather content repository 221, traffic content repository 217, and user profiles repository 219. As with the distance values, ETAs may be contingent upon a route that a user selects for navigational purposes. It is generally noted that the content of one or more of repositories 215-221 may be service provider maintained or maintained by a third-party content provider, e.g., one or more of content providers 119. Exemplary processes for providing navigational information, such as one or more dynamically identified approaching POIs, ETAs, or distances from approaching POIs are described with respect to FIGS. 4, 5, and 7. Exemplary navigational information presentations are more fully explained in accordance with FIGS. 6 and 8.

In order to provide selective access to the features and functionality of the managed navigational services of system 100, navigational platform 200 may also include an authentication module (not illustrated) for authenticating (or authorizing) users to the services. It is contemplated that the authentication module may operate in concert with communication interface 201 and/or user interface module 213. That is, the authentication module may verify user provided credential information acquired via communication interface 201 or user interface module 213 against corresponding credential information stored within a user profile of user profiles repository 219. By way of example, the credential information may include "log on" information corresponding to a user name, password, coded key, or other unique identification parameter, such a personal identification number (PIN). In other embodiments, the credential information may include any one, or combination of, a birth date, an account number (e.g., bank, credit card, billing code, etc.), a social security number (SSN), an address (e.g., work, home, IP, media access control (MAC), etc.), or telephone listing (e.g., work, home, cellular, etc.), as well as any other form of uniquely identifiable datum, e.g., biometric code, voice print, etc. Users may provide this information via client devices 103-107, such as by spoken utterances, dual-tone multi-frequency signals (DTMF), packetized transmission, etc. Unobtrusive security may be provided by positively identifying and screening users based on one or more of the aforementioned credentials which may be seamlessly provided when client devices 103-107 communicate with platform 200, such as a unique IP or MAC address. Other unobtrusive measures can be made available via user specific voice prints, etc.

Additionally, platform 200 may include one or more processors (or controllers) 211 for effectuating the aforementioned managed navigational services, as well as one or more memories (not shown) for permanent or temporary storage of one or more of the aforementioned variables or information.

Figure 3:
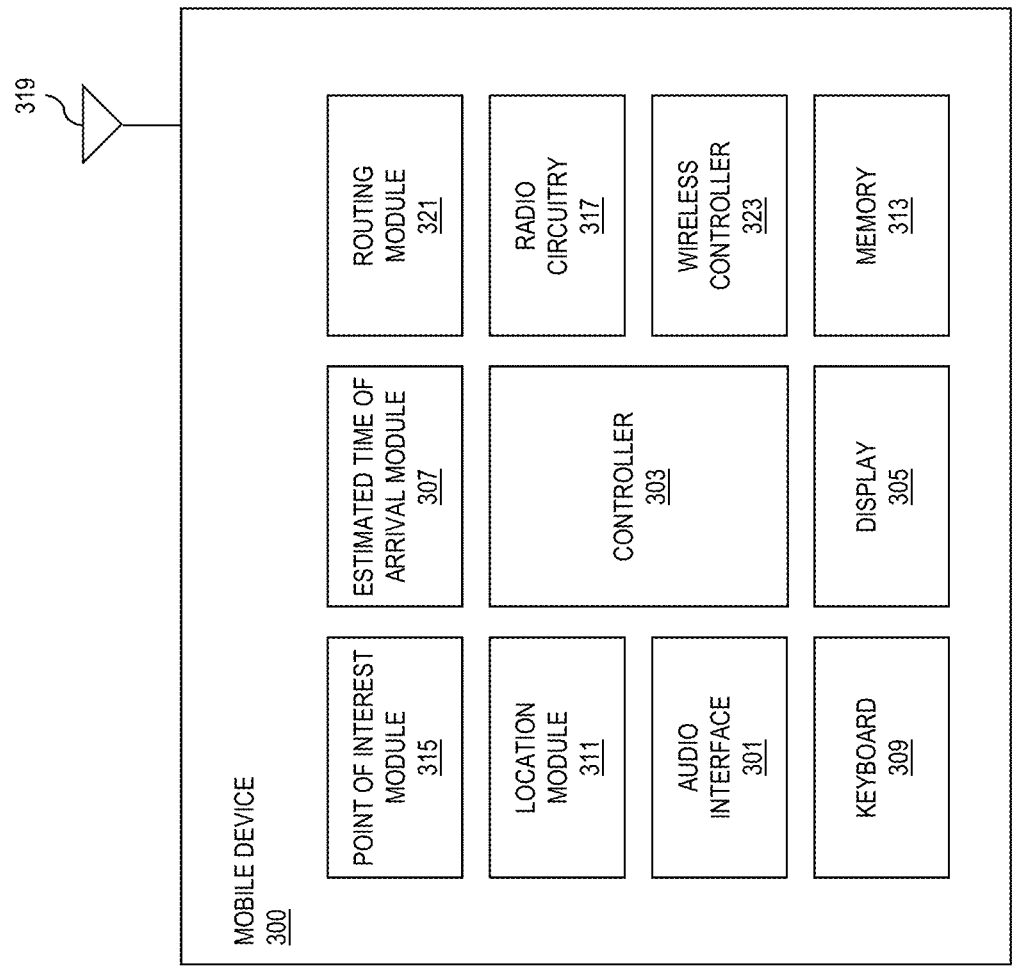
FIG. 3 is a diagram of a mobile device, according to an exemplary embodiment.

FIG. 3 is a diagram of a mobile device, according to an exemplary embodiment. Mobile device 300 may comprise computing hardware (such as described with respect to FIG. 9), as well as include one or more components configured to execute the processes described herein for accessing the managed navigational services of system 100. In this example, mobile device 300 includes audio interface 301, controller 303, display 305, ETA module 307, keyboard 309, location module 311, memory 313, POI module 315, radio circuitry 317 coupled to antenna 319, routing module 321, and wireless controller 323. While specific reference will be made thereto, it is also contemplated that mobile device 300 may embody many forms and include multiple and/or alternative components.

According to various embodiments, mobile device 300 is configured to dynamically receive and present approaching POIs to users based on real-time positioning information and, in certain instances, correlation with travel information, POI metadata, and/or one or more variable factors (such as historical travel times, traffic conditions, weather conditions, and the like). As such, mobile device 300 includes one or more client programs (or instructions) that operate thereon to access the managed navigational services of navigational platform 101; however, it is contemplated that these client programs may be executed via platform 101 and, thereby, accessible to users via mobile device 300. The client programs may relate to one or more GUIs configured to control the creation, customization, and management of POI content, as well as the generation of one or more user profiles, including at least one user-defined POI policy for dynamically obtaining one or more approaching POIs or searching for POI content.

In various instances, network browser applications may be provided for accessing similar applications made available by, for example, navigational platform 101. Users may interface with these client programs via audio interface 301, display 305, keyboard 309, and/or any other suitable input mechanism, e.g., buttons, joysticks, soft controls, touch panels, widget applications, etc. As such, audio interface 301 may include one or more components and corresponding functionality for effectuating a voice interface, e.g., speech synthesis and voice recognition capabilities.

Accordingly, the one or more client programs may be stored to memory 313, which may include volatile and/or non-volatile memory, such as erasable programmable read-only memory (EPROM), electrically erasable programmable read-only memory (EEPROM), flash memory, random access memory (RAM), read only memory (ROM), etc. Memory 313 may be implemented as one or more discrete devices, stacked devices, or integrated with controller 303. In addition, communication signals, such as navigational information 123, received by mobile device 300 may also be stored to memory 313. An exemplary GUI capable of execution on mobile device 300 is more fully described with respect to FIGS. 6 and 8.

Real time positioning information may be obtained or determined via location module 311 using SPS technology, such as GPS technology. In this way, location module 311 can behave as a GPS receiver. Thus, mobile device 300 employs location module 311 to communicate with a constellation 125 of satellites. These satellites 125 transmit very low power interference and jamming resistant signals received by the GPS receivers 311. At any point on Earth, the GPS receiver 311 can receive signals from multiple satellites (e.g., 6 to 11). Specifically, the GPS receiver 311 may determine three-dimensional geolocation (or spatial positioning information) from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by GPS satellites 125. Therefore, if mobile device 300 can identify the signals from at least four satellites 125, receivers 311 may decode the ephemeris and clock data, determine the pseudo range for each satellite 125 and, thereby, compute the spatial positioning of the receiving antenna (not shown). With GPS technology, mobile device 300 can determine its spatial position with great accuracy and convenience.

Additionally, mobile device 300 may employ A-GPS to mitigate the loss of GPS signals from obstructions between the GPS receiver 311 and satellites 125. When operating in A-GPS mode, mobile device 300 can provide for better in building or obstructed view spatial positioning information. Assistance data can be transmitted to mobile device 300 from, for example, wireless network 113. In an exemplary embodiment, A-GPS information may include ephemeris data, differential GPS correction data, timing data, and other aiding data. Using the aiding (or assistance) data, location module 311 performs spatial positioning calculations via, for example, controller (or processor) 303. In an exemplary embodiment, mobile device 300 can generate real-time speed and route adherence alerts using this calculated information. Additionally, transmission of the spatial positioning information need not be frequent. Transmission of the geo-location data can be made more compact because it is true location rather than pseudo range data. Also, mobile device 300 can more intelligently request assistance data because the device can itself determine when ephemeris data is no longer valid. It is also contemplated that other suitable navigation and location determination technologies may be utilized, such as A-FLT, CELL-ID, WLAN, etc. In any case, determined spatial positioning information may be transmitted to navigational platform 101 via radio circuitry 317 and/or wireless controller 323. It is generally noted that wireless controller 323 may also be utilized to communicate with a wireless headset (not shown). The headset can employ any number of standard radio technologies to communicate with the wireless controller 323; for example, the headset can be BLUETOOTH enabled. It is contemplated that other equivalent short range radio technology and protocols can be utilized.

Received navigational information, such as one or more dynamically identified approaching POIs, ETAs, routes, distances, etc., may be presented to users via display 305. In particular implementations, navigational information 123 may also include location-to-location navigational directions. Mobile device 300 is also configured to store and execute instructions for supporting the managed navigational services of system 100, as well as other communication functions made available via radio circuitry 317. In this manner, controller 303 controls the operation of mobile device 300 according to programs and/or data stored to memory 313. Control functions may be implemented in a single controller (or processor) or via multiple controllers (or processors). Suitable controllers may include, for example, both general purpose and special purpose controllers, as well as digital signal processors, local oscillators, microprocessors, and the like. Controller 303 may also be implemented as a field programmable gate array controller, reduced instruction set computer processor, etc. Controller 303 may interface with audio interface 301 that provides analog output signals to one or more speakers (not shown) and receives analog audio inputs from one or more microphones (not illustrated).

According to some embodiments, mobile device 300 includes ETA module 307, POI module 315, and routing module 321 for assuming one or more the aforementioned functions described with respect to navigational platform 200. In this way, modules 307, 315 and 321 will operate similarly to modules 203, 205, and 211 of navigational platform 200. It is noted, however, that real-time positioning information can be acquired via location module 311, instead of (or in addition to) presence service module 207.

Figure 4:
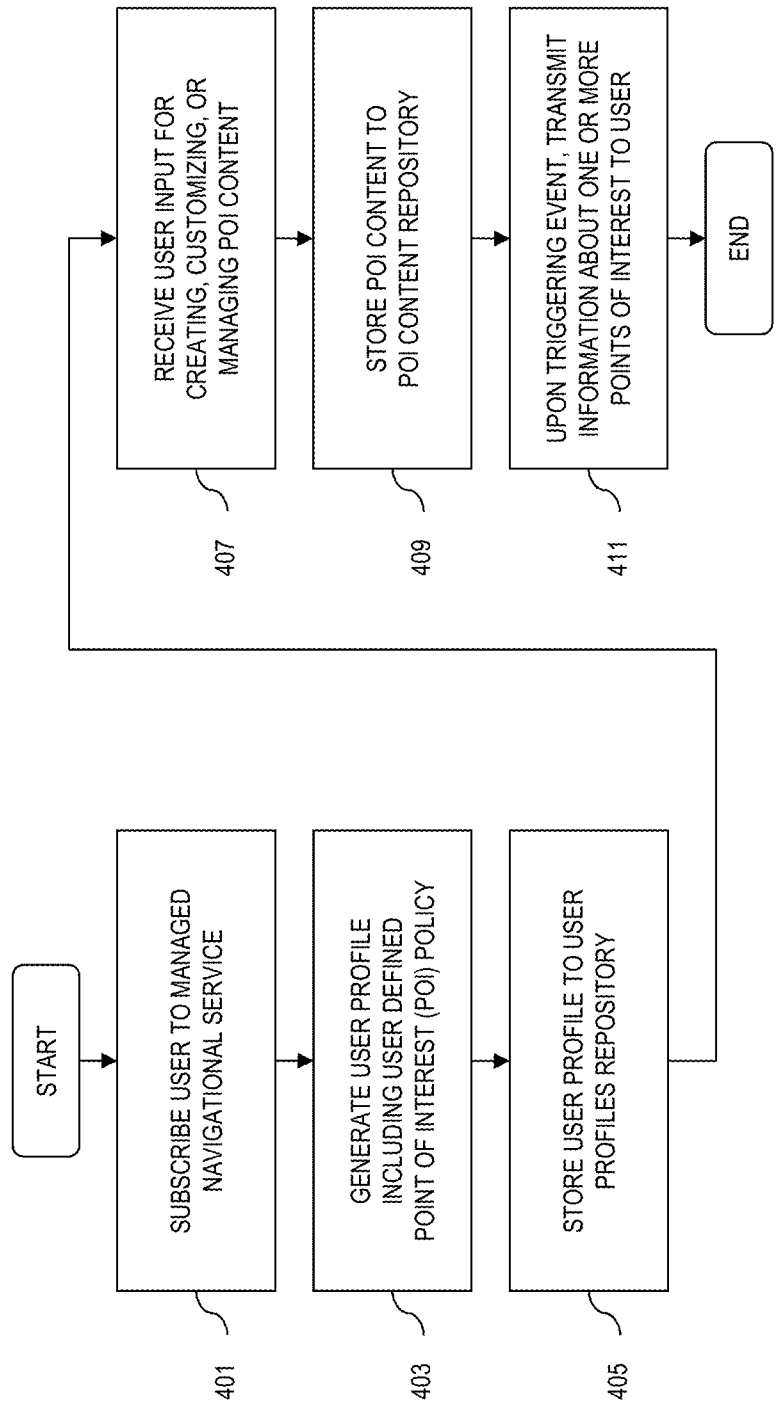
FIG. 4 is a flowchart of a process for providing navigational services that utilize user-defined points of interest, according to an exemplary embodiment.

FIG. 4 is a flowchart of a process for providing navigational services that utilize user-defined points of interest, according to an exemplary embodiment. For illustrative purposes, the process is described with reference to FIGS. 1 and 2. It is noted that the steps of the process may be performed in any suitable order, as well as combined or separated in any suitable manner. At step 401, navigational platform 200 subscribes a user to the managed navigational service of system 100. According to one embodiment, the user may subscribe utilizing a client device capable of processing and transmitting information over one or more of networks 105-111, such as computing device 103, mobile device 105, or voice station 107. Namely, the user may interact with an input interface of, for example, mobile device 105 to activate software resident on the device, such as a GUI or other networked application that interfaces with (or is implemented by) platform 200. Alternatively, the user may interact with a voice portal interfacing with (or implemented by) platform 200, wherein speech synthesis and voice recognition techniques are utilized to prompt the user for various inputs and to reduce the spoken utterances of the user to one or more corresponding inputs. As such, the user registers as a new subscriber of the managed navigational service, as well as obtains sufficient authentication information for establishing future sessions with platform 200. In certain embodiments, registration procedures may prompt the user to identify all client devices (e.g., client devices 103-107) that the user may employ to interact with system 100. In this manner, registered devices may be logically associated with the user.

Once registered, navigational platform 200 enables the user, per step 403, to generate a user profile including at least one user-defined POI policy for extending the managed navigational services to the user. The user profile may include the earlier described user profile information, e.g., username, password, account information, billing information, configuration information, and the like, as well as particular POI configuration information for dynamically identifying approaching POIs to the user, as will become more apparent below. POI configuration information may include, for example, information relating to POI category requirements (e.g., only particular taxonomical classes, etc.), POI instance requirements (e.g., only particular POI instances, etc.), POI proximity requirements (e.g., within "X" amount of distance, within "Y" amount of time, etc.), POI search requirements (e.g., identifying user-defined POIs only, service provider-defined POIs only, or both user-defined POIs and service provider defined POIs, etc.), and/or any other suitable requirements for dynamically identifying approaching POIs, e.g., identify approaching POIs experiencing (or not) certain weather conditions, identify approaching POIs with travel routes that are characterized by (or not by) certain traffic conditions, etc. Utilizing one or more of these requirements, users may establish one or more triggering events for dynamically identifying one or more approaching POIs.

After generating a user profile, platform 200 stores the user profile to a list of subscribers to the managed navigational services of system 100, as well as a list of subscriber device identifiers, authentication information, and user-defined profile(s) to user profiles repository 219, per step 405. It is noted that platform 200 may additionally (or alternatively) store or synchronize this information to a memory of, for instance, platform 200, one or more memories of client devices 103-107, or any other suitable memory or repository of system 100. Further, it is contemplated that users may directly interact with one or more of these storage facilities, such as user profiles repository 121. During step 407, navigational platform 200 may receive user input for creating, customizing, or managing POI content. For instance, the user may define one or more POI categories, POI instances, and/or POI metadata via interaction within one or more portals provided by (or interfaced with) platform 200. At step 409, the user-created, customized, or managed POI content is stored to, for example, POI content repository 117, which may be service provider maintained. According to certain embodiments, the POI content of repository 117 may be stored at or synchronized with a memory of one or more of client devices 103-107. Thus, navigational platform 200, per step 411, can transmit information about one or more approaching POIs to the user upon a triggering event, such as one or more events established within at least one user-defined POI policy of the user. It is also contemplated that platform 200 can signal one or more of the respective client devices (e.g., mobile device 103, computing device 113, or voice station 107) to perform certain tasks, such as, for example, when certain POI content is stored at, or accessible to, client devices 103-107.

Figure 5:
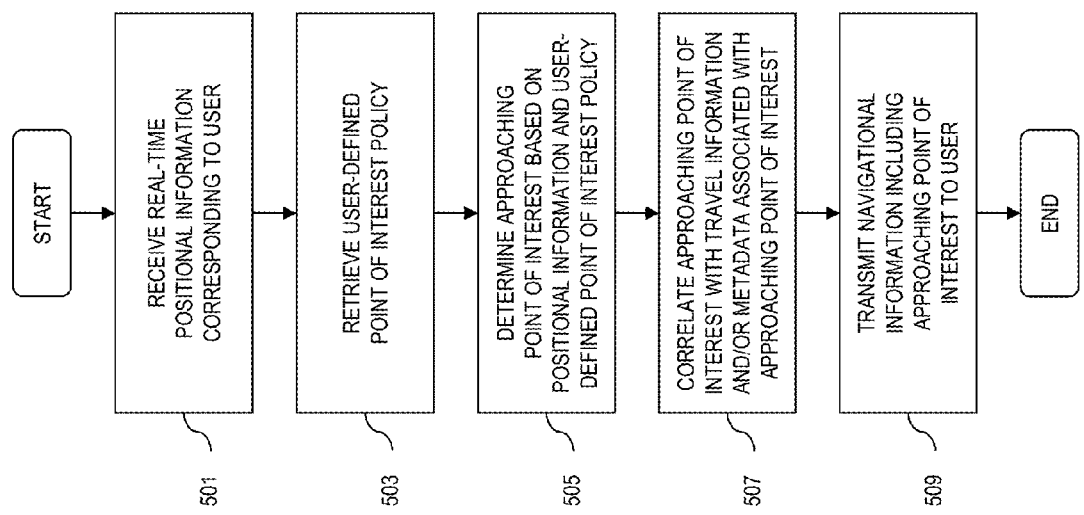
FIG. 5 is a flowchart of a process for providing navigational information including an approaching point of interest to a user, according to an exemplary embodiment.

FIG. 5 is a flowchart of a process for providing navigational information including an approaching point of interest to a user, according to an exemplary embodiment. For illustrative purposes, the process is described with reference to FIGS. 1-3. It is noted that the steps of the process may be performed in any suitable order, as well as combined or separated in any suitable manner. At step 501, navigational platform 200 (i.e., POI module 205) receives real-time positional information corresponding to a user (or subscriber). That is, a mobile device associated with the user (e.g., mobile device 105) determines its spatial position via, for example, location module 311, and transmits corresponding real-time positional information (e.g., latitude, longitude, altitude, etc.) to platform 200 over one or more of networks 109-115. The real-time positional information is received at communication interface 201 and ported to POI module 205. It is noted that the location of mobile device 105 may be additionally (or alternatively) tracked via presence service module 207. In such instances, the real-time positional information may be ported to presence service module 207 and provided to POI module 205 based on certain criteria stored to, for example, a user-defined POI policy corresponding to the subscriber. In other instances, presence service module 207 may determine spatial positioning of mobile device 105 and port this information to POI module 205 for dynamically identifying one or more approaching POIs to the user. In an exemplary embodiment, "approaching" is defined in geographical proximity and/or time relative to the route of the mobile device 105.

Accordingly, navigational platform 200 may retrieve, per step 503, a user-defined POI policy from, for instance, user profiles repository 219 via communication interface 201 upon initialization of the managed navigational services by the user. Service initialization may automatically occur based on activation of mobile device 105 or selectively occur based on user activation via a GUI interface of mobile device 105 or selection of a voice portal option. In alternative embodiments, retrieval of the user-defined POI policy may be performed in response to reception of real-time positional information. For instance, upon an initial reception of real-time positional information from mobile device 105, platform 200 may retrieve the user-defined policy and temporarily store it to a local memory, such that upon subsequent receptions of real-time positional information, the user-defined policy need not be successively retrieved from, for instance, repository 219 but, instead, accessed from the local memory.

Utilizing the real-time positional information, POI module 205 determines, per step 505, one or more approaching POIs. That is, POI module 205 queries, for instance, POI content repository 215 for POIs based on the real-time positional information. In certain exemplary embodiments, determination of approaching POIs may be further based on other criteria stored to the user-defined POI policy, such as the aforementioned POI configuration information. For instance, particular approaching POIs may be dynamically identified based on ambient conditions (e.g., POIs accessible without traffic encumbrances, POIs unaffected by certain weather conditions, etc.), operational status (e.g., POIs capable of being reached during certain hours of operation, etc.), POI category specifications (e.g., taxonomical classifications, etc.), POI instances (e.g., POI "X" at location "Y," etc.), scheduling information (e.g., only POIs capable of being visited before a certain time, POIs capable of being visited without impinging upon a pre-established engagement, etc.), spatial range limitations (e.g., within "X" amount of distance from current spatial position), temporal range limitations (e.g., within "Y" minutes of current spatial position), or other suitable criteria.

At step 507, POI module 205 correlates approaching POIs with travel information and/or metadata associated with the approaching POIs. For instance, correlation with POI metadata may include POI module 205 retrieving associated POI metadata for the dynamically identified POIs, wherein the POI metadata may be included within a navigational presentation, such as the navigational presentation of FIG. 6. Correlation may also be utilized to narrow the results of the dynamically identified POIs. For example, correlating a dynamically identified POI with POI metadata may produce the hours of operation for the dynamically identified POI. If the user would not be able to reach the POI before the POI closes, then POI module 205 may discard this particular POI. It is noted, however, that one or more parameters within the user-defined POI policy may be utilized by POI module 205 for determining whether or not to present such POIs to the user. Namely, certain users may nevertheless be interested in "learning" of the POI, even if they would be unable to reach the POI before it closes. Correlation with travel information will be described in more detail in connection with the description of FIG. 7. As such, navigational information including at least one dynamically identified, approaching POI is transmitted to the user via communication interface 201, during step 509. This navigational information can then be presented to the user via, for instance, mobile device 105.

Figure 6:
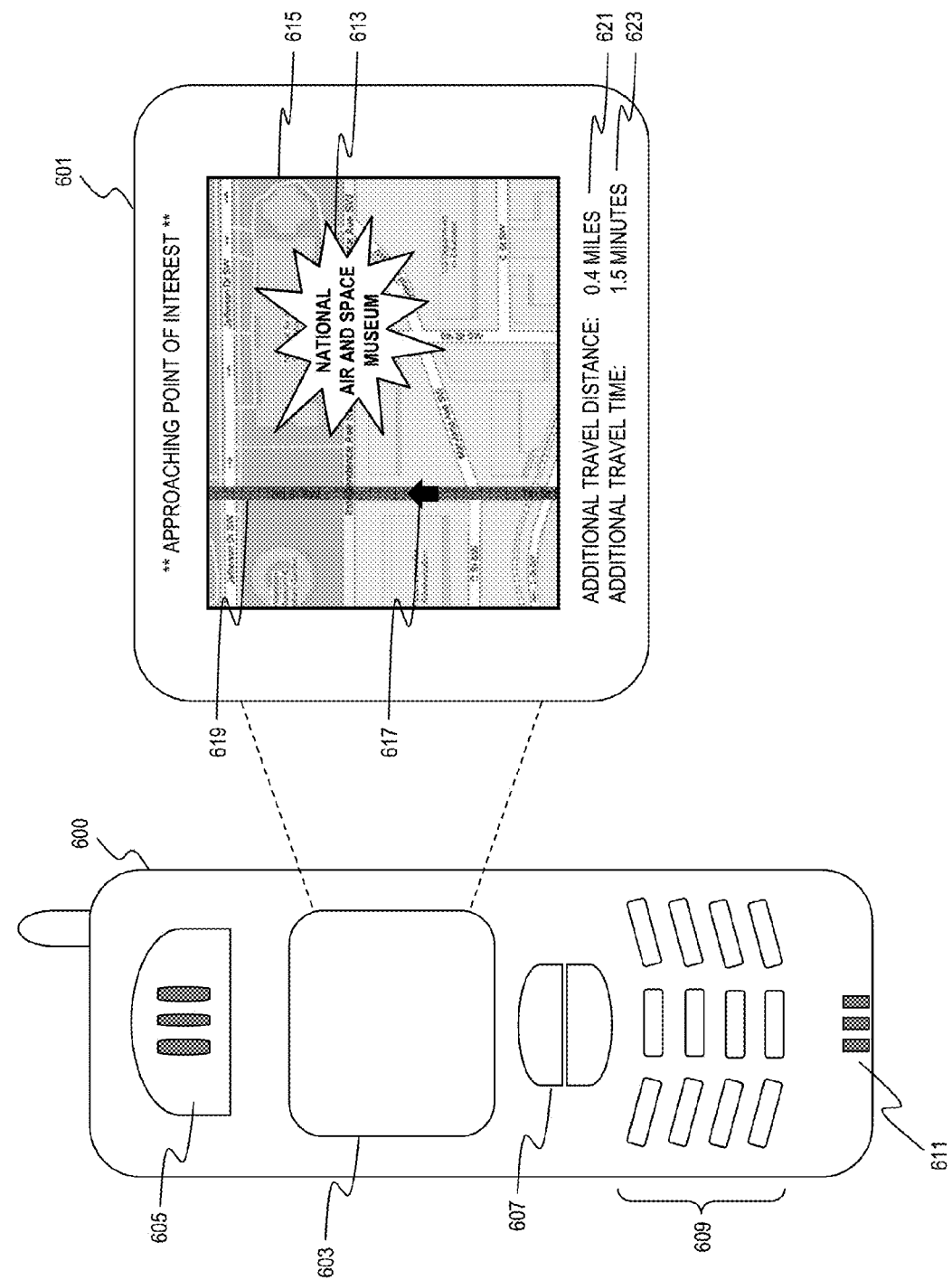
FIG. 6 is a diagram of a mobile device presenting navigational information including an approaching point of interest, according to an exemplary embodiment.

FIG. 6 is a diagram of a mobile device presenting navigational information including an approaching point of interest, according to an exemplary embodiment. In this example, users may employ mobile device 600 to request, search for, and/or obtain navigational information including one or more POIs. It is noted that the one or more POIs may be dynamically provided to mobile device 600 from, for instance, navigational platform 101 based on real-time positional information corresponding to the location of mobile device 600. That is, the one or more POIs can correspond to approaching POIs. For illustrative purposes, mobile device 600 is described with respect to a mobile phone, such as a cellular phone, configured to provide a GUI 601 to users via display 603. While shown presenting navigational information, GUI 601 enables users to request, search for, and/or obtain navigational information as well. Auditory components of the content, such as turn-by-turn directions, approaching POI announcements, descriptions, or other mapping information, may be output via one or more suitable transducers (e.g., speakers) 605. Cursor buttons 607, keypad 609, and microphone 611 enable users to interact with GUI 601 of display 603. As such, mobile device 600 is, in exemplary embodiments, also capable of speech synthesis and voice recognition.

According to one embodiment, GUI 601 includes an identified POI 613 overlaid on, for instance, a topological depiction (or map) 615 of a geographic area surrounding POI 613. In addition to POI 613, map 615 may include various cartographic features, such as one or more buildings, designators, landmarks, roadways, signs, etc. Further, map 615 may be utilized for navigation and, therefore, may include a current spatial position 617 of the user, as well as a route 619 that is "currently" being traversed by the user of mobile device 600. GUI 601 also provides users with distance information 621 and timing information 623 corresponding to POI 613 and, thereby, relating to the proximity of POI 613 to the current spatial position 617 of the user. As shown, distance information 612 conveys an amount of "additional travel distance" required for visiting POI 613, and timing information 623 conveys an amount of "additional travel time" required for visiting POI 613. As will become more apparent in the description of FIG. 7, distance information 621 and/or timing information 623 may be determined based on one or more variables, such as historic travel times to POI 613, current and historic traffic conditions, current and historic weather conditions, or any other suitable variable possibly effecting the additional amount of travel distance or travel time required for visiting POI 613 from a "current" spatial position of the user, such as a determined route to POI 613.

According to certain embodiments, interaction with POI 613, e.g., selection of POI 613, enables users to obtain augmented and/or updated navigational information including, for instance, distance information, routing information, and timing information corresponding to POI 613, as well as POI metadata concerning POI 613. For example, interaction with POI 613 may provide users with contact information, POI descriptors (or descriptions), hours of operation, product or service offerings (e.g., menus, catalogues, etc.), product or service prices, or any other suitable information about POI 613. An augmented presentation is explained in more detail in conjunction with FIG. 8. While not illustrated, GUI 601 may also include "soft controls" for controlling the presentation of GUI 601, inputting information, or otherwise enabling user interaction with GUI 601, e.g., interaction with POI 613. These functions may also be provided via cursor buttons 607, keypad 609, and microphone 611. In addition, GUI 601 may be employed for the purposes of creating POI content, customizing POI content, managing POI content, requesting POI content for certain POI instances and/or POI categories, and/or searching one or more memories or repositories of POI content (e.g., POI content repository 117), as well as obtaining navigational directions to and from various starting points and ending destinations and/or creating (or updating) user profile information, such as a user-defined POI policy for obtaining dynamically identified approaching POIs. In such instances, GUI 601 may include one or more fields for inputting parameters and/or one or more soft controls corresponding to, for example, an alphanumeric keyboard or other suitable interface for inputting parameters. These soft controls and corresponding input fields may be provided by user interface module 213. The controls, input fields, and presentations may also be provided via transducer(s) 605 and microphone 609 acting as an interactive voice response (IVR) interface.

Figure 7:
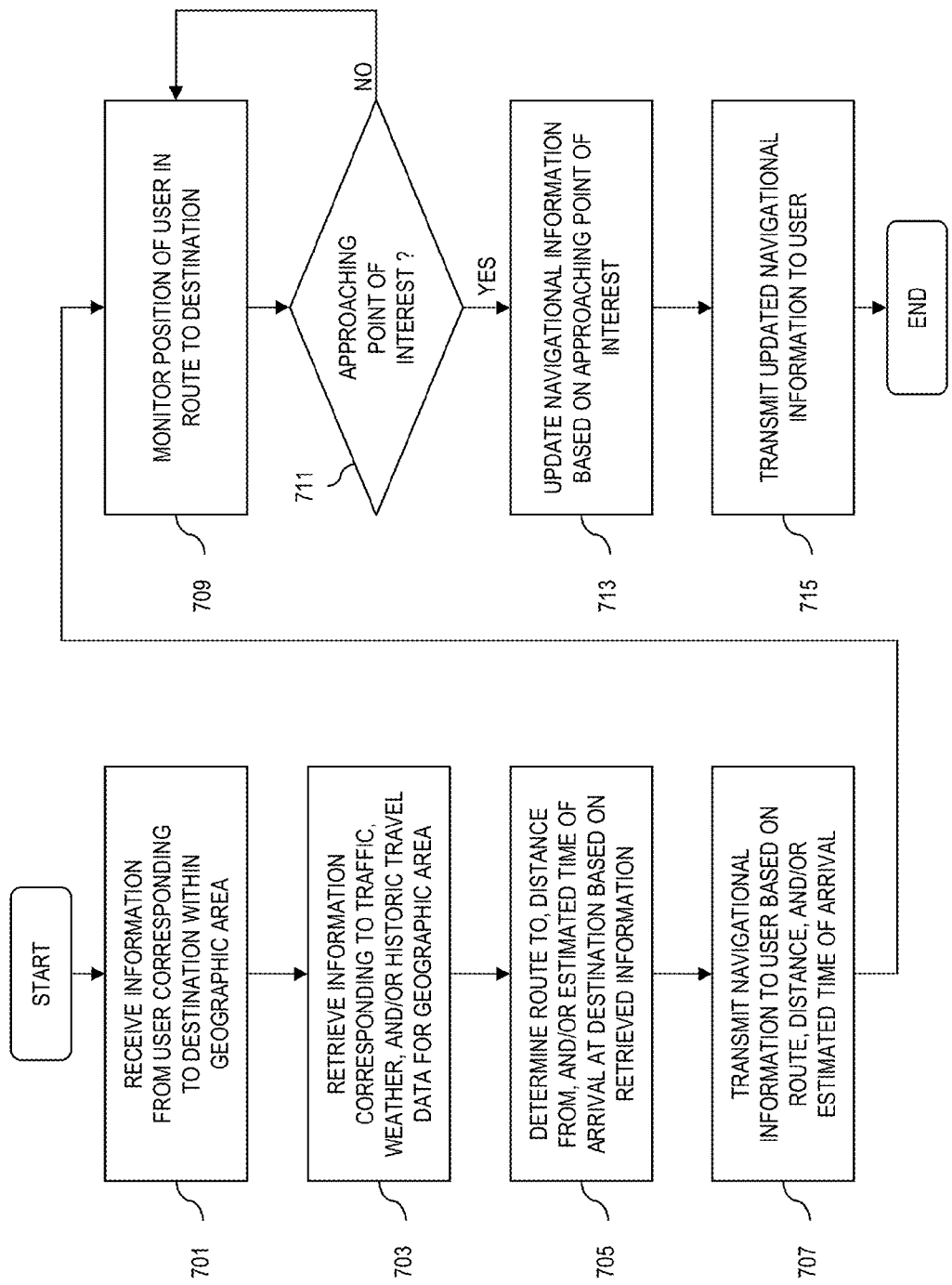
FIG. 7 is a flowchart of a process for presenting an approaching point of interest as part of a navigational service, according an exemplary embodiment.

FIG. 7 is a flowchart of a process for presenting an approaching point of interest as part of a navigational service, according an exemplary embodiment. For illustrative purposes, the process is described with reference to FIGS. 1-3. It is noted that the steps of the process may be performed in any suitable order, as well as combined or separated in any suitable manner. At step 701, navigational platform 200 receives information from a user via, for example, mobile device 105. That is, the subscriber establishes a communication session with platform 200 via mobile device 105 over one or more of networks 109-115, wherein mobile device 105 submits various information to platform 200 corresponding to a geographic area, such as a starting and/or destination location. It is noted that the starting location may be established as the "current" spatial position of the user, i.e., of mobile device 105, and, therefore, need not be input by the user. According to certain embodiments, the communication session may be established through a voice portal or networked application provided by (or otherwise interfacing with) platform 200, i.e., user interface module 213. For the purposes of explanation, it is assumed that the information is for itinerary purposes, i.e., for turn-by-turn navigational directions. As such, it is contemplated that the user may also provide one or more requirements, parameters, or options for obtaining navigational information, such as a request to minimize highway travel, a request to initialize dynamic POI identification procedures based on a user-defined POI policy, or other suitable requirement, parameter, or option.

In response, platform 200 (i.e., routing module 211) retrieves information corresponding to the geographic area, such as traffic information, weather information, and/or historic travel information via communication interface 201, per step 703. This information may be retrieved from one or more content providers 119, POI content repository 117, user profiles repository 121, or other suitable repository of system 100, such as one or more repositories (or memories) maintained by the service provider of the managed navigational services. Based on the retrieved traffic information, weather information, and historic travel information, as well as the information provided to navigational platform 200 by the user, routing module 211 determines, per step 705, a route to the destination from the starting location, a "current" distance from the destination location, and/or an ETA at the destination. While described with reference to only one destination, multiple destinations may be established, such as in a planned trip including multiple stopping points along the way. In such instances, multiple distances, ETAs, and routes may be determined. During step 707, platform 200 transmits navigational information, i.e., the determined route, distance from, and ETA at the destination, to mobile device 103 via communication interface 201. According to one embodiment, the navigational information may be generated by platform 200 "on-the-fly" and, thereby, be transmitted to mobile device 105 as one or more streams of navigational information while the user traverses a planned route.

Accordingly, navigational platform 200 (i.e., presence service module 207) monitors the spatial positioning of the user, i.e., of mobile device 105, while in route to the destination, per step 709. At step 711, platform 200 (i.e., POI module 205) determines whether the user is approaching any POIs based on, for example, a user-defined POI policy stored to, for instance, user profiles repository 121. If no POIs are being approached, then presence service module 207 continues to monitor the position of the user. If at least one POI is identified, then, in step 713, navigational platform 200 (i.e., POI module 205 and routing module 211) updates the navigational information based on the identified approaching POI. That is, platform 200 utilizes a process similar to that of FIG. 5 to determine the updated navigational information. As previously mentioned, the dynamically identified POIs will be correlated to the travel information, i.e., the previously determined navigational information and the spatial positioning of the user. In this manner, identified POIs may be further filtered based on a direction of travel, speed of travel, ability to access particular POIs, etc. Thus, during step 715, the updated navigational information is transmitted to the user, i.e., to mobile device 105. It is noted that the updated navigational information may selectively account for one or more approaching points of interest. Namely, updated distances, ETAs, routes, etc., may be determined if one or more approaching POIs are intended to be visited by the user. For instance, the updated navigational information may be determined and transmitted to the user upon the user interacting with GUI 601 of FIG. 6, e.g., selecting POI 613. An exemplary presentation of navigational information including distance information, routing information, and timing information, is explained in associated with FIG. 8.

Figure 8:
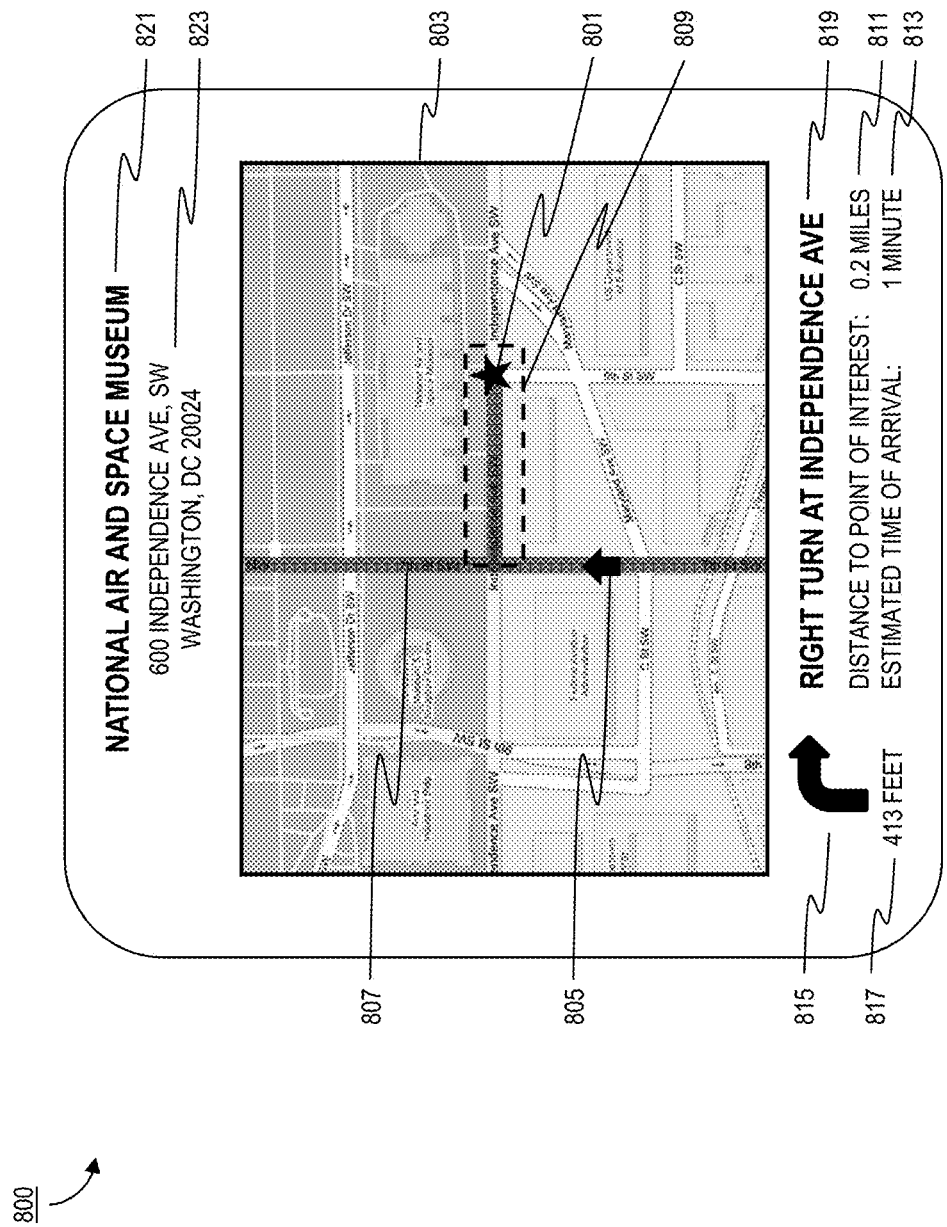
FIG. 8 is a diagram of a mobile device display for presenting an approaching point of interest, according to an exemplary embodiment.

FIG. 8 is a diagram of a mobile device display for presenting, according to an exemplary embodiment. In this example, display 800 may be provided by mobile device 600 of FIG. 6. Presentation of this navigational information may be in response to user interaction with POI 613 of GUI 601. In other instances, display 800 is presented to a user in response to a user search or request for navigational information corresponding to a particular POI instance, e.g., POI 801. At any rate, display 800 includes, similarly to that of GUI 601, an identified POI 801 overlaid on a topological depiction (or map) 803 of a geographic area surrounding POI 801. Map 803 may, likewise, include various cartographic features, such as one or more buildings, designators, landmarks, roadways, signs, etc. It is generally noted that the presentation of display 800 will include sufficient detail so as to provide meaningful feedback to the user with respect to a current location and/or planned route of the user. That is, map 803 may be utilized for navigation and, therefore, may include a current spatial position 805 of the user, as well as a planned route 807 that is "currently" being traversed by the user of, for example, mobile device 103. In this example, however, display 800 provides an augmented (or updated) presentation. Namely, route 807 has been amended to include an updated route section 809 selectively accounting for approaching POI 801. As such, display 800 includes updated distance information 811 and updated timing information 813 corresponding to the user visiting approaching POI 801. While not illustrated, distance, timing, and routing information for previously identified and planned destinations may also be updated based on the possibility that the user may visit or the user actually selecting to visit POI 801. Furthermore, one or more sections may be provided for conveying turn-by-turn directions, e.g., sections 815, 817, and 819. Section 815 provides a depiction of a "next" direction of travel, e.g., right turn, while section 817 provides an amount of distance in which the "next" direction of travel will be encountered, e.g., "413 FEET." Further, section 819 provides a description of the "next" direction, e.g., "RIGHT TURN AT INDEPENDENCE AVE."

Other information concerning POI 801 may be presented in sections 821 and 823. As shown, section 821 provides a title (or name) of approaching POI 801, i.e., "NATIONAL AIR AND SPACE MUSEUM," while section 823 provides an address of approaching POI 801, i.e., "600 INDEPENDENCE AVE, SW, WASHINGTON, DC 20024." It is contemplated, however, that sections 821 and 823 may be utilized to convey select POI metadata, such as one or more of the aforementioned forms (or types) of POI metadata, e.g., contact information, description, hours of operation, product or service offerings (e.g., menus, catalogues, etc.), product or service prices, etc. Accordingly, display 800 may include various GUI features for viewing this information via display 800, such as in a new or difference window, as overlay content within the illustrated window, etc. These GUI features may include navigation trees, an expandable table of contents, or FlashMedia presentation of selectable entries. Display 800 may include various input fields, selectable elements (e.g., toggle buttons, check boxes, radio buttons, sliders, list boxes, spinners, drop-down lists, menus, toolbars, ribbons, combo boxes, icons, etc.), output fields (e.g., labels, tooltips, balloon helps status bars, progress bars, infobars, etc.) and windows, as well as any other suitable interface widget for interfacing with display 800 and/or the various features of the managed navigational services of system 100.

The processes described herein for providing managed navigational services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
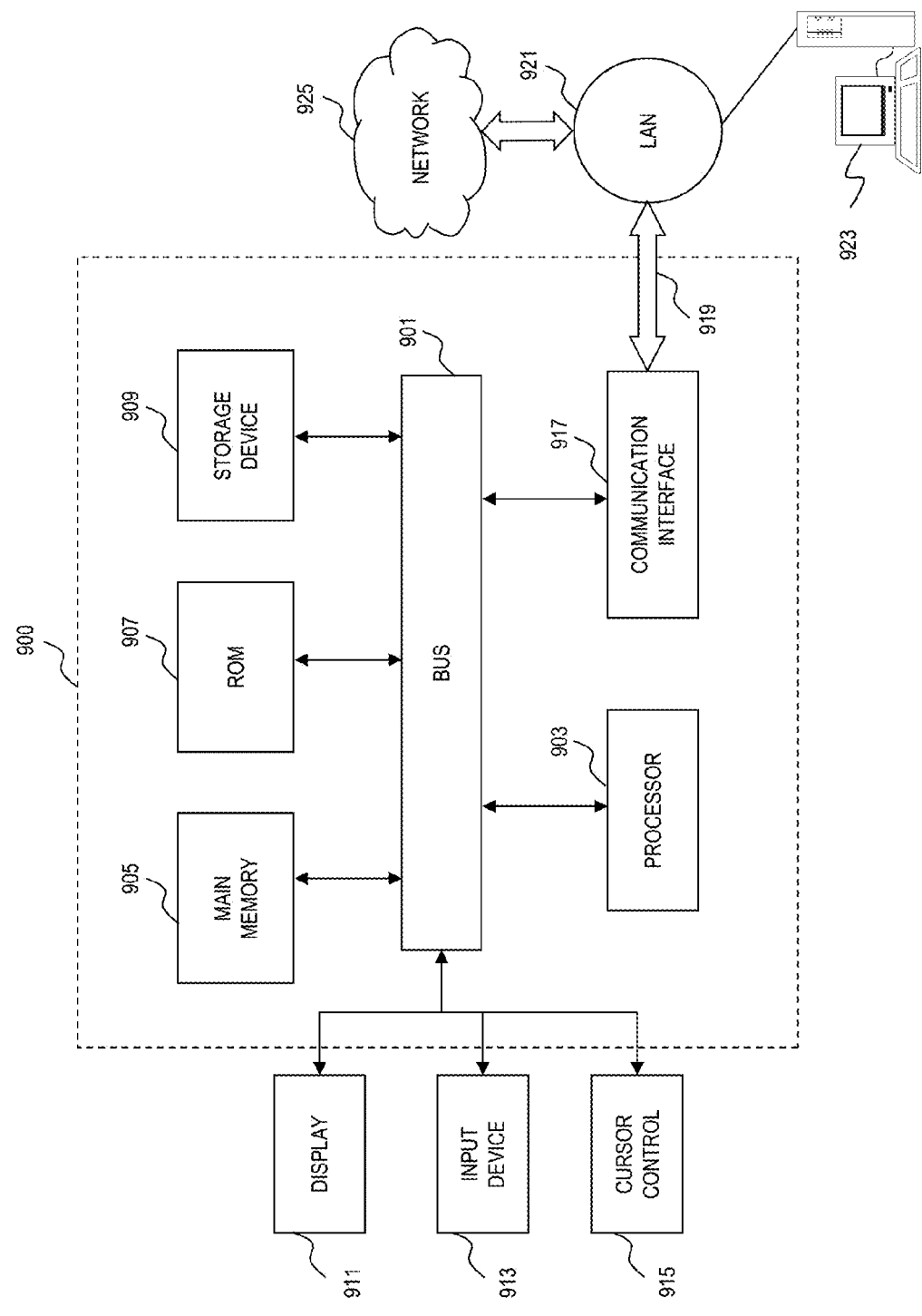
FIG. 9 is a diagram of a computer system that can be used to implement various exemplary embodiments.

FIG. 9 illustrates computing hardware (e.g., computer system) 900 upon which an embodiment according to the invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A system, comprising:
a user profiles repository to store user profiles associated with respective users of a plurality of client devices,
a particular user profile, of the user profiles, including one or more user-defined point of interest (POI) policies for dynamically identifying geographically approaching POIs to a particular user associated with the particular user profile and a particular client device, of the plurality of client devices,
the one or more user-defined POI policies including:
traffic conditions associated with the particular user,
weather conditions associated with the particular user,
historic travel times associated with the particular user, and
one or more of a POI category requirement, a POI instance requirement, a POI proximity requirement, or a POI search requirement;
a POI repository to store POI content provided by content providers,
the POI content including one or more of:
one or more POI categories,
one or more POI instances, or
POI metadata,
the POI metadata being associated with the one or more POI categories and the one or more POI instances, and including one or more of:
contact information associated with the one or more POI instances,
descriptions of the one or more POI instances,
hours of operation of the one or more POI instances,
product or service offerings of the one or more POI instances, or
product or service prices of the one or more POI instances; and
a platform device communicating with the plurality of client devices, the user profiles repository, and the POI repository via one or more networks, the platform device being configured to:
receive the user profiles from the user profile repository, via the one or more networks,
receive the POI content from the POI repository, via the one or more networks,
receive real-time positional information corresponding to the particular client device, of the plurality of client devices, via the one or more networks,
determine the particular user profile based on the particular client device,
determine particular POI content, of the POI content, based on the real-time positional information and based on the particular user profile, and
provide the particular POI content to the particular client device, via the one or more networks.

2. The system of claim 1, where the particular POI content includes one or more of:

information associated with an approaching point of interest associated with the particular user of the particular client device, information associated with a distance between a current location of the particular client device and a location of the approaching point of interest, or information associated with an estimated time of arrival, of the particular user, at the location of the approaching point of interest.

3. The system of claim 2, where the approaching point of interest is predefined by the particular user and stored in the POI repository.

4. The system of claim 2, where the estimated time of arrival, of the particular user at the location of the approaching point of interest, is determined based on the traffic conditions associated with the particular user.

5. The system of claim 2, where the estimated time of arrival, of the particular user at the location of the approaching point of interest, is determined based on the weather conditions associated with the particular user.

6. The system of claim 2, where the estimated time of arrival, of the particular user at the location of the approaching point of interest, is determined based on the historic travel times associated with the particular user.

7. The system of claim 1, where the one or more networks include one or more of:
   a telephone network,
   a wireless network,
   a service provider network, or
   a data network.

8. A non-transitory computer-readable medium storing instructions, the instructions comprising:
   one or more instructions that, when executed by one or more processors of a device, cause the one or more processors to:
      receive, via one or more networks, user profiles from a user profile repository,
         the user profiles being associated with respective users of a plurality of client devices,
         a particular user profile, of the user profiles, including one or more user-defined point of interest (POI) policies for dynamically identifying geographically approaching POIs to a particular user associated with the particular user profile and a particular client device, of the plurality of client devices,
         the one or more user-defined POI policies including:
            traffic conditions associated with the particular user,
            weather conditions associated with the particular user,
            historic travel times associated with the particular user, and
            one or more of a POI category requirement, a POI instance requirement, a POI proximity requirement, or a POI search requirement;
      receive, via the one or more networks, POI content from a POI repository,
         the POI content being provided by content providers,
         the POI content including one or more of:
            one or more POI categories,
            one or more POI instances, or
            POI metadata,
               the POI metadata being associated with the one or more POI categories and the one or more POI instances, and including one or more of:
                  contact information associated with the one or more POI instances,
                  descriptions of the one or more POI instances,
                  hours of operation of the one or more POI instances,
                  product or service offerings of the one or more POI instances, or
                  product or service prices of the one or more POI instances;
      receive real-time positional information corresponding to the particular client device, of the plurality of client devices, via the one or more networks,
      determine the particular user profile based on the particular client device,
      determine particular POI content, of the POI content, based on the real-time positional information and based on the particular user profile, and
      provide the particular POI content to the particular client device, via the one or more networks.

9. The non-transitory computer-readable medium of claim 8, where the particular POI content includes one or more of:
   information associated with an approaching point of interest associated with the particular user of the particular client device,
   information associated with a distance between a current location of the particular client device and a location of the approaching point of interest, or
   information associated with an estimated time of arrival, of the particular user, at the location of the approaching point of interest.

10. The non-transitory computer-readable medium of claim 9, where the instructions further comprise:
    one or more instructions that, when executed by the one or more processors, cause the one or more processors to:
       receive, from the particular client device, the information associated with the approaching point of interest; and
       store the information associated with the approaching point of interest in the POI repository.

11. The non-transitory computer-readable medium of claim 9, where the instructions further comprise:
    one or more instructions that, when executed by the one or more processors, cause the one or more processors to:
       determine the estimated time of arrival, of the particular user, at the location of the approaching point of interest, based on the traffic conditions associated with the particular user.

12. The non-transitory computer-readable medium of claim 9, where the instructions further comprise:
    one or more instructions that, when executed by the one or more processors, cause the one or more processors to:
       determine the estimated time of arrival, of the particular user, at the location of the approaching point of interest, based on the weather conditions associated with the particular user.

13. The non-transitory computer-readable medium of claim 9, where the instructions further comprise:
    one or more instructions that, when executed by the one or more processors, cause the one or more processors to:
       determine the estimated time of arrival, of the particular user, at the location of the approaching point of interest, based on the historic travel times associated with the particular user.

14. The non-transitory computer-readable medium of claim 9, where the approaching point of interest corresponds to a particular POI category, of the one or more POI categories, and to a particular POI instance, of the one or more POI instances.

15. A method comprising:
receiving, by a computing device and via one or more networks, user profiles from a user profile repository,
the user profiles being associated with respective users of a plurality of client devices,
a particular user profile, of the user profiles, including one or more user-defined point of interest (POI) policies for dynamically identifying geographically approaching POIs to a particular user associated with the particular user profile and a particular client device, of the plurality of client devices,
the one or more user-defined POI policies including:
traffic conditions associated with the particular user,
weather conditions associated with the particular user,
historic travel times associated with the particular user, and
one or more of a POI category requirement, a POI instance requirement, a POI proximity requirement, or a POI search requirement;
receiving, by the computing device and via the one or more networks, POI content from a POI repository,
the POI content being provided by content providers,
the POI content including one or more of:
one or more POI categories,
one or more POI instances, or
POI metadata,
the POI metadata being associated with the one or more POI categories and the one or more POI instances, and including one or more of:
contact information associated with the one or more POI instances,
descriptions of the one or more POI instances,
hours of operation of the one or more POI instances,
product or service offerings of the one or more POI instances, or
product or service prices of the one or more POI instances;
receiving, by the computing device, real-time positional information corresponding to the particular client device, of the plurality of client devices, via the one or more networks,
determining, by the computing device, the particular user profile based on the particular client device,
determining, by the computing device, particular POI content, of the POI content, based on the real-time positional information and based on the particular user profile, and
providing, by the computing device, the particular POI content to the particular client device, via the one or more networks.

16. The method of claim 15, where the particular POI content includes one or more of:
information associated with an approaching point of interest associated with the particular user of the particular client device,
information associated with a distance between a current location of the particular client device and a location of the approaching point of interest, or
information associated with an estimated time of arrival, of the particular user, at the location of the approaching point of interest.

17. The method of claim 16, further comprising:
determining the estimated time of arrival, of the particular user, at the location of the approaching point of interest, based on the traffic conditions associated with the particular user.

18. The method of claim 16, further comprising:
determining the estimated time of arrival, of the particular user, at the location of the approaching point of interest, based on the weather conditions associated with the particular user.

19. The method of claim 16, further comprising:
determining the estimated time of arrival, of the particular user, at the location of the approaching point of interest, based on the historic travel times associated with the particular user.

20. The method of claim 16, where the approaching point of interest corresponds to a particular POI instance of the one or more POI instances.

* * * * *